US009057000B2

(12) United States Patent
Anderson et al.

(10) Patent No.: US 9,057,000 B2
(45) Date of Patent: Jun. 16, 2015

(54) PROTEIN AND STARCH COMPOSITIONS, METHODS FOR MAKING AND USES THEREOF

(75) Inventors: Kevin R. Anderson, Cedar Rapids, IA (US); Michael A. Porter, Maple Grove, MN (US); Jagannadh V. Satyavolu, Cedar Rapids, IA (US)

(73) Assignee: CARGILL, INCORPORATED, Wayzata, MN (US)

( * ) Notice: Subject to any disclaimer, the term of this patent is extended or adjusted under 35 U.S.C. 154(b) by 66 days.

(21) Appl. No.: 13/002,492

(22) PCT Filed: Jul. 2, 2009

(86) PCT No.: PCT/US2009/049508
§ 371 (c)(1),
(2), (4) Date: Jan. 3, 2011

(87) PCT Pub. No.: WO2010/003054
PCT Pub. Date: Jan. 7, 2010

(65) Prior Publication Data
US 2011/0100256 A1 May 5, 2011

Related U.S. Application Data

(60) Provisional application No. 61/133,898, filed on Jul. 3, 2008.

(51) Int. Cl.
*C09J 189/00* (2006.01)
*C09J 103/02* (2006.01)
(Continued)

(52) U.S. Cl.
CPC ............... *C09D 103/02* (2013.01); *C08L 3/02* (2013.01); *C08L 3/04* (2013.01); *C08L 3/08* (2013.01); *C08L 3/10* (2013.01); *C08L 3/16* (2013.01); *C08L 3/18* (2013.01); *C08L 89/00* (2013.01); *C09D 189/00* (2013.01); *C09J 103/02* (2013.01); *C09J 103/04* (2013.01); *C09J 103/08* (2013.01); *C09J 103/10* (2013.01); *C09J 103/16* (2013.01); *C09J 103/18* (2013.01); *C09J 189/00* (2013.01); *D21H 19/50* (2013.01); *D21H 19/54* (2013.01)

(58) Field of Classification Search
None
See application file for complete search history.

(56) References Cited

U.S. PATENT DOCUMENTS 2,021,947 A 11/1935 Schopp
2,059,343 A 11/1936 Hadfield
(Continued)

FOREIGN PATENT DOCUMENTS

EP 0838513 A2 4/1998
GB 1001997 8/1965
(Continued)

OTHER PUBLICATIONS

Translation of JP05171049.*
(Continued)

*Primary Examiner* — Melvin C Mayes
*Assistant Examiner* — Stefanie Cohen (57) ABSTRACT

The present disclosure relates to protein-starch compositions. The disclosure also relates to processes for preparing the protein-starch compositions. Further, the disclosure relates to uses of the protein-starch compositions in the preparation of adhesives or binders. Further, the disclosure relates to adhesive formulations that include protein-starch containing compositions and to paper products resulting from the processes herein.

27 Claims, 3 Drawing Sheets

(51) Int. Cl.

| | |
|---|---|
| *C09D 103/02* | (2006.01) |
| *C09D 189/00* | (2006.01) |
| *C09J 103/04* | (2006.01) |
| *C09J 103/08* | (2006.01) |
| *C09J 103/10* | (2006.01) |
| *C09J 103/16* | (2006.01) |
| *C09J 103/18* | (2006.01) |
| *D21H 19/50* | (2006.01) |
| *D21H 19/54* | (2006.01) |
| *C08L 3/02* | (2006.01) |
| *C08L 3/04* | (2006.01) |
| *C08L 3/08* | (2006.01) |
| *C08L 3/10* | (2006.01) |
| *C08L 3/16* | (2006.01) |
| *C08L 3/18* | (2006.01) |
| *C08L 89/00* | (2006.01) |

(56) References Cited

U.S. PATENT DOCUMENTS

| | | | |
|---|---|---|---|
| 2,354,318 A | | 7/1944 | Hughes et al. |
| 2,360,828 A | | 10/1944 | William |
| 2,526,598 A | | 10/1950 | Barrett et al. |
| 2,894,847 A | * | 7/1959 | Wright .................. 106/614 |
| 3,047,427 A | | 7/1962 | Dratz |
| 3,157,533 A | | 11/1964 | Clancy et al. |
| 3,328,184 A | | 6/1967 | Weber |
| 3,372,044 A | | 3/1968 | Weber |
| 3,411,925 A | | 11/1968 | Lauterbach |
| 4,462,838 A | | 7/1984 | Andres et al. |
| 4,474,847 A | | 10/1984 | Schroder et al. |
| 4,675,351 A | * | 6/1987 | Brown ............................ 524/20 |
| 5,455,066 A | | 10/1995 | Broich et al. |
| 5,523,293 A | * | 6/1996 | Jane et al. ..................... 530/356 |
| 5,702,741 A | | 12/1997 | Reutimann |
| 6,187,367 B1 | | 2/2001 | Cho et al. |
| 7,067,651 B2 | * | 6/2006 | Poovarodom et al. ........ 536/124 |
| 2003/0143417 A1 | | 7/2003 | Kesselring et al. |
| 2004/0261659 A1 | | 12/2004 | Neale et al. |
| 2006/0174801 A1 | | 8/2006 | Gagnon et al. |
| 2006/0229207 A1 | | 10/2006 | Mentink et al. |
| 2007/0102129 A1 | | 5/2007 | Hwang et al. |
| 2007/0122571 A1 | | 5/2007 | Eckl et al. |
| 2007/0240823 A1 | * | 10/2007 | Alevisopoulos et al. ..... 156/336 |
| 2008/0295735 A1 | | 12/2008 | Ragaru et al. |
| 2009/0155447 A1 | * | 6/2009 | Moore et al. .................. 426/656 |

FOREIGN PATENT DOCUMENTS

| | | | |
|---|---|---|---|
| GB | 2443026 | | 4/2008 |
| JP | 01043173 A | * | 2/1989 |
| JP | 05171049 A | * | 7/1993 |
| JP | 03-342930 | | 11/2002 |
| WO | 0058085 | | 10/2000 |
| WO | 02053663 A1 | | 7/2002 |
| WO | 2006005890 | | 1/2006 |

OTHER PUBLICATIONS

Sessa et al, paradigm for successful utilization of renewable resources, 1998 p. 192.*
International Search Report mailed Sep. 16, 2009 for PCT/US2009/049508 filed Jul. 2, 2009.
Supplementary European Search Report mailed Jun. 14, 2011 for EP09775403.8.

* cited by examiner

PROTEIN AND STARCH COMPOSITIONS, METHODS FOR MAKING AND USES THEREOF

FIELD OF THE DISCLOSURE

The invention is generally directed to a composition comprising a protein and a starch as well as methods of making and using the composition. In one aspect of the invention, the composition is used in an adhesive, binder or coating. In a further aspect of the invention, the composition is used in an adhesive to enhance at least one of viscosity or bonding strength of the adhesive, binder or coating.

BACKGROUND

For example, starches have been used as natural binders in the production of paper coatings to bind pigment particles together to form a smooth coating substrate on the paper surface. Starches are used in paper coatings primarily for their economy and ease of use, but are inferior to other binders such as proteins and synthetic latex in their binding ability and coating surface properties such as print gloss. Starch dextrins have also been used in the production of paper adhesives for purposes of remoistening sealants, for box carton gluing, and other purposes. The starch dextrins suffer from relatively low dry binding strength compared to other adhesives and do not provide significant water repellency to the dry adhesive.

Proteins have also been used as natural binders in paper coatings and have demonstrated better binding ability than starches, but are difficult to use and need to be chemically modified and/or depolymerized before use in order to obtain reasonable coating viscosity levels. Protein based adhesives, binders and coatings also tend to be more expensive than starch based adhesives, binders and coatings. Additionally, proteins have been used as a replacement for resins such as urea/formaldehyde resins for gluing wood layers in the production of plywood. The urea/formaldehyde adhesive provides good binding ability to the wood layers, as well as provides good water repellency to the adhesive. Proteins, in combination with a water proofing resin, have been used to replace the urea/formaldehyde adhesive in plywood manufacture. Adhesive formulations using an unmodified protein, however, suffer from high viscosity and low solids content compared to the urea/formaldehyde formulation, thus impacting drying times and overall production.

Thus, there exists a need for an adhesive, binder or coating that has ease of use, good binding abilities and optimized cost.

SUMMARY OF THE DISCLOSURE

The present disclosure is directed to protein-starch comprising compositions, and the use thereof in adhesive and binder formulations. The composition of the present disclosure comprises from about 1% to about 99% of at least one plant protein and from about 1% to about 99% of at least one starch. The present disclosure is also directed to adhesive formulations, such as plaster, paper, paperboard, and wood adhesives, as well as binder formulations such as in paper coatings, paints, and foundry binders, which are produced utilizing the protein-starch compositions described herein.

In one embodiment, the present invention is directed to an adhesive or binder composition comprising from about 1% to about 99% of a plant protein and from about 1% to about 99% of a starch, wherein the plant protein is a seed-based protein selected from the group consisting of yellow dent corn protein, waxy corn protein, high amylose corn protein, soybean protein, wheat protein, oat protein, pea protein, barley protein, sunflower protein, canola protein, and mixtures thereof. In one aspect, the composition comprises from about 10% to about 90% of a seed-based protein and from about 10% to about 90% of a starch and in another aspect, the composition comprises from about 30% to about 70% of a seed-based protein and from about 30% to about 70% of a starch.

In another embodiment, the present invention is directed to an adhesive or binder composition comprising from about 1% to about 99% of a plant protein and from about 1% to about 99% of a starch, wherein the plant protein is a modified plant protein modified by chemical modification, physical modification, enzymatic modification, or mixtures thereof.

In one aspect, the modified plant protein is a chemically modified plant protein modified by depolymerization, oxidization, reduction, etherification, esterification, amidization, defatting, cationization, crosslinking, hydrophobization, grafting, or mixtures thereof. In a particular aspect, the chemically modified plant protein is a depolymerized plant protein. The depolymerized plant protein may be depolymerized with an acid or a base. Alternatively, the chemically modified plant protein is an oxidized plant protein and the oxidizing agent of the oxidized plant protein is selected from the group consisting of metal salts of hypochlorite, metal salts of permanganate, hydrogen peroxide, organic peroxides, peracids, and mixtures thereof. In still another aspect, the chemically modified plant protein is an etherified plant protein such as a hydroxyalkyl protein selected from the group consisting of hydroxyethyl plant protein, hydroxypropyl plant protein, hydroxybutyl plant protein, and mixtures thereof. In a further aspect, the chemically modified plant protein is an esterified plant protein such as an alkenyl succinic anhydride modified protein. The chemically modified plant protein may also be a crosslinked plant protein that has been crosslinked with a reactive monomer or a reactive polymer. In this instance, the reactive monomer is selected from the group consisting of an aldehyde, a ketone, an epichlorohydrin, a dicarboxylic acid, a phosphorous oxyhalide, an alkali earth metal salt of trimetaphosphate, a phosphorous oxyanhydride that is a metal salt of a linear polyphosphate, a linear mixed anhydride, and mixtures thereof. In a particular instance, the reactive polymer is a polyamido-amine epihalohydrin polymer. The chemically modified plant protein may further be an amidized plant protein wherein the amidization of the plant protein is selected from the group consisting of aryl-, alkyl-, alkenyl-, aralkyl-, aralkenyl-anhydrides, aryl-, alkyl-, alkenyl-, aralkyl-, aralkenyl-ester and acid halide derivatives of carboxylic acids, ammonia, primary amines, secondary amines, intramolecular combinations thereof, and mixtures thereof. The chemically modified plant protein may also be a grafted plant protein selected from the group consisting of aldehydes, anhydrides, epoxides, epihalohydrins, and mixtures thereof.

In another aspect, the modified plant protein is a physically modified plant protein modified by thermal modification in the presence of water, thermal modification in the absence of water, pressure modification, and mixtures thereof. In a particular aspect, the thermal treatment in the presence of water is cooking the plant protein. Alternatively, the thermal treatment may be conducted in the absence of water such as by desolventization or dry roasting of the plant protein. In a further aspect, the pressure treatment of the plant protein is extrusion of the plant protein.

In yet another aspect, the modified plant protein is an enzyme modified plant protein modified by reacting a plant protein with a protease enzyme, a lipase enzyme, a phosphorylase enzyme, an oxidase enzyme, and mixtures thereof.

In a further embodiment, the present invention is directed to an adhesive or binder composition comprising from about 1% to about 99% of a plant protein and from about 1% to about 99% of a starch, wherein the starch is a seed-based starch selected from the group consisting of dent corn starch, waxy corn starch, high amylose corn starch, potato starch, tapioca starch, wheat starch, oat starch, pea starch, barley starch, rice starch, sago starch, sorghum starch, sweet potato starch, and mixtures thereof. In one aspect, the composition comprises from about 10% to about 90% of a plant protein and from about 10% to about 90% of a seed-based starch and in another aspect, the composition comprises from about 30% to about 70% of a plant protein and from about 30% to about 70% of a seed-based starch.

In another embodiment, the present invention is directed to an adhesive or binder composition comprising from about 1% to about 99% of a plant protein and from about 1% to about 99% of a starch, wherein the starch is a modified starch modified by chemical modification, enzyme modification, physical modification, and mixtures thereof.

In one aspect the starch is a modified starch that is chemically modified by depolymerization, oxidization, reduction, etherification, esterification, defatting, cationization, crosslinking, hydrophobization, grafting, and mixtures thereof. In a particular aspect, the chemically modified starch is depolymerized with an acid. Alternatively, chemically modified starch is an oxidized starch. In one instance, the oxidized starch is oxidized with agents selected from the group consisting of, metal salts of hypochlorite, metal salts of permanganate, hydrogen peroxide, organic peroxides, peracids, and mixtures thereof. The chemically modified starch may also be an esterified starch that has been esterified with an agent selected from the group consisting of a carboxylic acid, an anhydride, an ester, an acid halide, a phosphorous oxyhalide, a phosphorous oxyanhydride, a sulfuryl halide, an intramolecular mixture thereof, a polymer mixture thereof, and a mixture thereof. In another aspect, the chemically modified starch is a crosslinked starch crosslinked with agents selected from the group consisting of, an aldehyde, a ketone, an epihalohydrin, a dicarboxylic acid, a phosphorous oxyhalide, an alkali earth metal of trimetaphosphate, a phosphorous oxyanhydride, that is a metal salt of a linear polyphosphate, a linear mixed anhydride, a polyamido-amino epihalohydrin polymer, and a mixture thereof. In still another aspect, the chemically modified starch is a grafted starch interpolymer. In a particular aspect, the grafted starch interpolymer is grafted with a monomer or polymer.

In another aspect, the modified starch is a physically modified starch modified by thermal modification in the presence of water, thermal modification in the absence of water, pressure modification, and mixtures thereof. In a particular aspect, the thermal treatment in the presence of water is cooking the starch. In a further aspect, the thermal treatment in the absence of water is dextrinization of the starch. The pressure treatment may be extrusion of the starch.

In still another aspect, the modified starch is an enzyme modified starch and the enzymatic modification of the starch is selected from the group consisting of an alpha amylase enzyme, a protease enzyme, a lipase enzyme, a phosphorylase enzyme, an oxidase enzyme, and mixtures thereof.

The present invention is also directed to an adhesive or binder composition comprising from about 1% to about 99% of a seed-based protein and from about 1% to about 99% of a seed-based starch. In a particular aspect, the composition comprises from about 10% to about 90% of a seed-based protein, and from about 10% to about 90% of a seed-based starch. In another aspect, the composition comprises from about 30% to about 70% of a seed-based protein, and from about 30% to about 70% of a seed-based starch. In one embodiment, the present invention is directed to an adhesive or binder composition comprising from about 1% to about 99% of a seed-based protein and from about 1% to about 99% of a seed-based starch, where the adhesive or binder is a plaster, a joint compound, a sealant, a corrugating glue, a laminating adhesive, a wood glue, a plywood adhesive, a strand board adhesive, a wall board adhesive, a ceiling tile binder, a particle board binder, paper coating binder, a paint binder, or a foundry binder.

The present invention is further directed to a process for producing an adhesive or binder composition comprising mixing from about 1% to about 99% of a plant protein and from about 1% to about 99% of a starch. In a particular aspect, the plant protein and starch are mixed dry to form the protein-starch composition. Alternatively, the plant protein and starch are mixed by first mixing the plant protein with water to form a first slurry and then mixing the dry starch with the first slurry to form a second slurry containing the protein-starch composition. The plant protein and starch may also be mixed to form the protein starch composition by mixing the starch with water to form a first slurry and then mixing the dry protein with the first slurry to form a second slurry containing the protein-starch composition. In still another aspect, the plant protein is mixed with water to form a first slurry, the starch is mixed with water to form a second slurry, and the first and second slurry are combined to form the protein-starch composition. In yet another aspect, the starch is mixed with water and heated to a gelatinized paste, and the dry plant protein is combined with the starch paste to form a protein-starch composition. Still further, the plant protein is mixed with water and heated to a paste, and the dry starch is combined with the protein paste to form a protein-starch composition. In yet another aspect, the starch is mixed with water and heated to form a first gelatinized paste, and the plant protein is mixed with water and heated to form a second paste, and the first and second pastes are combined to form the protein-starch composition.

The present invention is also directed to an adhesive or binder composition made by the process of mixing from about 1% to about 99% of a plant protein and from about 1% to about 99% of a starch. In one aspect, the adhesive or binder composition is selected from the group consisting of a plaster, a joint compound, a sealant, a corrugating glue, a laminating glue, a wood glue, a plywood adhesive, a strand board adhesive, a wallboard binder, a ceiling tile binder, a paper coating binder, a paint binder, and a foundry binder.

DETAILED DESCRIPTION OF THE DISCLOSURE

As previously stated, there exists a need for an adhesive, binder or coating that has both ease of use and good binding abilities. Starch based adhesives have relatively low cost and low viscosity, which makes them easier to mix, pump and spread. Despite these positive characteristics, starch based adhesives do not have good binding abilities. In contrast, protein based adhesives have good binding abilities but can be expensive and more viscous, making them difficult to work with. Simply reducing the total solids content of the protein in a protein based adhesive, binder or coating to reduce viscosity does not solve the problem as high solids are desired for rapid curing and/or drying of the adhesive, binder or coating. The higher solids content also lowers the cost of use and raises the quality of the bonding ability. Furthermore, there exists a need for an adhesive, binder or coating that can be more readily formulated for optimum performance across a wide variety of substrates, processing conditions and performance requirements. This would be particularly useful in industrial applications such as building materials in which performance requirements such as cost, ease of use and binding ability are important.

It has been surprisingly discovered that a composition comprising both starch and protein may be used in an adhesive, binder or coating to produce an adhesive binder or coating that better meets performance requirements such as cost, ease of use and binding ability. Previously, it was thought that incorporation of a starch dextrin into a protein based adhesive, binder, or coating would have minimal impact or at best a linear impact on the overall viscosity of the protein based adhesive and that binding quality would be similarly decreased. This was not observed, however, and in fact the viscosity of the protein based adhesive dropped significantly while the protein binding ability demonstrated minimal changes. It has further been discovered that a binder, adhesive or coating comprising both starch and protein can be more readily formulated for optimum performance across a wide variety of substrates, processing conditions and performance requirements. This may be done, in part, using compositions comprising various ratios of starch and protein.

Accordingly, in one aspect, the invention is directed to a composition comprising a protein and a starch as well as methods of making and using the composition. In another aspect, the invention is a composition of starch and protein (also referred to herein as protein-starch composition) that may be used in adhesives, binders and coatings. In yet another aspect, the invention is a composition comprising a starch and a protein may be used in adhesive, binder and coating formulations for use in preparation of various products. In still another aspect, the invention includes adhesive, binder and coating formulations, such as plaster, paper, paperboard, and wood adhesives, paper coatings, paints, and foundry binders utilizing the protein starch composition described herein. In a further aspect, the composition of starch and protein may be used to increase the dry strength and water repellency of a starch based adhesive, as well as lower the viscosity of a protein based adhesive without impacting the binding ability of the protein, thus allowing for increased solids formulations. In another aspect of the invention, the composition of starch and protein may be used in the preparation of paper coating compositions and paint compositions with higher binding strength and improved gloss development over traditional starch based binder formulations.

The following information regarding proteins and starches information is presented to merely as background and to assist the understanding of one of ordinary skill in the art. The examples are not intended in any way to otherwise limit the scope of the disclosure.

Proteins are polymers made up of individual monomers called amino acids. There are 20 different amino acids that can be combined to form the various proteins essential to plant and animal life. In one aspect of the invention, the starting material employed includes material derived from defatted oilseed material, although other forms of plant-based material may be employed. The fat may be substantially removed from dehulled oilseeds by a number of different methods, e.g., by simply pressing the dehulled seeds or by extracting the dehulled seeds with an organic solvent, such as hexane. The solvent extraction process is typically conducted on dehulled oilseeds that have been flattened into flakes. The product of such an extraction is referred to as an oilseed "white flake." For example, soybean white flake is generally obtained by pressing dehulled soybeans into a flat flake and removing a substantial portion of the residual oil content from the flakes by extraction with hexane. The residual solvent can be removed from the resulting "white flake" by a number of methods. In one procedure, the solvent is extracted by passing the oilseed white flake through a chamber containing hot solvent vapor. Residual hexane can then be removed from soybean white flakes by passage through a chamber containing hexane vapor at a temperature of at least about 75° C. Under such conditions, the bulk of the residual hexane is volatilized from the flakes and can subsequently be removed, e.g., via vacuum. The material produced by this procedure is referred to as flash desolventized oilseed white flake. The flash desolventized oilseed white flake is then typically ground to produce a granular material. If desired, however, the flash desolventized oilseed white flake may be used directly in the present method.

Another defatted oilseed derived material suitable for use in the present process is derived from material obtained by removing the hexane from the oilseed white flake by a process referred to as "toasting." In this process, the hexane extracted oilseed white flakes are passed through a chamber containing steam at a temperature of at least about 105° C. This causes the solvent in the flakes to volatilize and be carried away with the steam. The resulting product is referred to as toasted oilseed flake. As with flash desolventized oilseed white flake, toasted oilseed flake may be used directly in the present method or may be ground into a granular material prior.

Oilseed materials of this type, such as soybean meal, are used in a wide variety of other applications and are readily available from commercial sources. Other examples of oilseed materials which are suitable for use include canola meal, linseed meal, sunflower meal, cottonseed meal, peanut meal, lupin meal and mixtures thereof. Cereal-derived proteins, such as wheat gluten or corn gluten meal may also be suitable protein sources for this use.

The extent of heating of a protein may be determined using the Protein Dispersibility Index (PDI). The PDI is determined essentially by measuring the percentage of nitrogen in a sample that can be dispersed in water under standardized conditions, according to AOCS Ba 10a-05. Typical soy flakes prepared with no added heating (untoasted) will have a PDI value greater than 85, and the proteins in the flake can be characterized as native (not denatured). It is possible to control the heating of the defatted flake to achieve a wide range of PDI values, where the decreasing PDI is associated with an increasing prevalence of denatured (non-native) protein. Denaturation refers to the process by which the "natural" configuration and conformation of the protein is lost due to chemical (acids, bases, chaotropic agents, hydrolases, etc.) or physical (heat, shear, etc.) processes. It is commonly observed that the properties of a protein-containing material may be dependent on the extent of native and denatured proteins present. Common properties of soy protein known to vary as a consequence of PDI include protein solubility at neutral pH, viscosity, color, and extent of lysine modification. Three grades of commonly available soy flours are 90PDI (untoasted), 70PDI (lightly toasted) and 20PDI (heavily toasted), but one skilled in the art would recognize that many intermediate grades could be prepared, and that even more extensive heating would result in flours with lower PDI.

Depending on the type, heating time, and temperature the flake may be exposed to during the desoventizing operation, changes in the Protein Dispersability Index (PDI) may occur. The PDI is a measurement of the degree the ground, desolventized flake may be dispersed in water without particle settling. For example, commercial sales of ground protein flour may be expressed in terms of its Ground Mesh Size/PDI. A 200/90 for example, is a ground soy protein flour that passes through a 200 mesh screen, and has a Protein Dispersability Index of 90%. A 100/20 soy protein flour on the other hand indicates the flour passes through a 100 mesh screen, but has only a 20% PDI. The lower PDI value is indicative of a higher level of heat treatment during the desolventization process. The various proteins are useful in many food and feed applications. In water systems, these proteins may undergo a phase change upon heating, generally referred to as denaturation.

Starch is a carbohydrate polymer based on the glucose monomer. In seed-bearing plants, starch is synthesized and stored as starch granules in the seed for future energy use. Some crops store starch granules in other organs, including for example, tubers, roots and the like. These starch granules are small (1-100 micron) particles composed of two major types of glucose polymers. Amylose is a largely linear starch polymer, and Amylopectin is a highly branched starch polymer. As the seed is developing into a seedling, the starch polymers are converted back to glucose as energy for the emerging plant until the root system is developed. Many crops are harvested for nutritional value to both human and animal consumers. Oat, barley, wheat, maize, potato, are some examples of the important food and feed crops. One of the most important harvested seed crops is maize or corn. Starch may make up to 70% by weight of the corn kernel. The starch may be extracted from the corn kernel by either a dry milling or wet milling process. In wet milling of corn, the corn kernels are re-hydrated from approximately 14% storage moisture to 40% moisture by a process called steeping. Once the steeped corn is of the appropriate moisture, the softened kernel is conveyed through a series of grind mills to remove the components such as the germ, the fiber outer layer, the corn protein (zein), and finally the purified starch. Now in a low solids slurry stream, the starch slurry may be further purified to a concentrated slurry of approximately 40% solids. There are several important varieties of corn hybrids that are processed. The vast majority of corn grown and processed is yellow dent corn, but other important hybrids are waxy corn, and hi-amylose corn. These varieties differ from yellow dent corn in the ratio of amylose to amylopectin polymer ratio in the starch granule. The purified starch granules are used in many food and industrial applications. Often, chemical modifications may be made to the starch granules in order to enhance or change their beneficial properties. Also, in the majority of applications, the starch granules are heated in water to a gelatinized paste. The gelatinized paste is generally the most useful form of starch. Another important modification to starch is a process called dextrinization. Starch in a dry form is introduced into a dextrin reactor and heated to a high temperature, generally between 100° C. and 150° C., in combination with a catalytic amount of acid. The dry reaction causes polymer rearrangement within the starch granule and changes the gelatinized paste properties. Some dextrins have been modified to the point where they become cold water soluble which eliminates the need for heating the starch to form a gelatinized paste.

In an aspect of the invention, the protein-starch compositions comprise from about 10% to about 90% of at least one plant protein and from about 10% to about 90% percent of at least one starch. In another aspect, the protein-starch compositions comprise from about 30% to about 70% percent of at least one plant protein and from about 30% to about 70% of at least one starch.

In one aspect of the invention, the protein of the protein-starch compositions is a seed-based protein. In this embodiment, the seed-based protein comprises from about 1% to about 99% of the protein and starch composition. In still another embodiment, the seed-based protein comprises from about 10% to about 90% of the protein-starch composition. It yet another embodiment, the seed-based protein comprises from about 30% to about 70% of the protein-starch composition.

In the present compositions, there may be utilized any plant protein. Preferably, the plant protein may be a seed-based protein. The seed-based protein may be derived from any source such as yellow dent corn, waxy corn, high amylose corn, soybean, wheat, oat, pea, barley, sunflower, linseed, canola, and mixtures thereof.

In another embodiment, the starch of the protein-starch compositions comprise a seed-based starch. In this embodiment, the seed-based starch comprises from about 1% to about 99% of the protein and starch composition. Preferably, the seed-based starch comprises from about 10% to about 90% of the protein-starch composition. More preferably, the seed-based protein comprises from about 30% to about 70% of the protein-starch composition.

In the present compositions, there may be utilized any starch. In one aspect, the starch may be a seed-based starch. The seed-based starch may be derived from any suitable source such as dent corn starch, waxy corn starch, high amylose corn starch, wheat starch, oat starch, pea starch, barley starch, rice starch, sorghum starch, and mixtures thereof. In another aspect, the starch may be a starch derived from tubers, roots and the like, such as potatoes, tapioca roots, and sweet potatoes for example. Thus in this context, the starch may be potato starch, sago starch, tapioca starch, sago starch and mixtures thereof.

In another embodiment, the starch of the protein-starch compositions comprise a modified starch. In more detail, at least one of the starches may be a starch that has been modified by a chemical, physical, or enzymatic modification.

Chemical modification includes any treatment of a starch with a chemical that results in a modified starch. Within chemical modification are included, but not limited to, depolymerization of a starch, oxidation of a starch, reduction of a starch, etherification of a starch, esterification of a starch, crosslinking of a starch, defatting of a starch, hydrophobization of a starch, grafting of a starch with a reactive monomer or another reactive polymer to form a grafted starch interpolymer, and the like. Chemically modified starches may also be prepared by using a combination of any of the chemical treatments.

Suitable examples of chemically modified starches that may be used in the protein-starch compositions of the present disclosure include the reaction of alkenyl succinic anhydride, particularly n-octenyl succinic anhydride, with starch to produce a hydrophobic esterified starch; the reaction of 2,3-epoxypropyltrimethylammonium chloride with starch to produce an etherified cationic starch; the reaction of ethylene oxide with starch to produce an etherified hydroxyethyl starch; the reaction of hypochlorite with starch to produce an oxidized starch; the reaction of an acid with starch to produce an acid depolymerized starch; the reaction of a phosphorous oxychloride with starch to produce a crosslinked starch; defatting of a starch with a solvent such as methanol, ethanol, propanol, hexane, methylene chloride, chloroform, carbon tetrachloride, and the like, to produce a defatted starch; the reaction of acrylic acid with starch in the presence of a polymerization initiator to produce a grafted starch interpolymer.

An etherified starch may be produced utilizing any conventional manner. For example, and starch source may be reacted with suitable etherifying agents such as an organohalide, an organosulfate, an organosulfonate, an organophosphate, an organophosphonate, an organosilane, an organoisocyanate, an organoazide, an aldehyde, a ketone, an epoxide, an epihalohydrins, an alkene, an alkyne, an intramolecular mixture thereof, a polymer mixture thereof, and a mixture thereof. Hydroxyalkyl starches that may be used in the present compositions, such as hydroxyethyl starch, hydroxypropyl starch, and hydroxybutyl starch may be produced by any conventional manner. For example, hydroxyethyl starch may be produced by the etherification of any starch with ethylene oxide. Similarly, hydroxypropyl starch may be produced by the etherification of any starch with propylene oxide. In both instances, the starch is treated with the alkylene oxide, under alkaline pH conditions, for a length of time sufficient to achieve a product suitable for use as a hydroxyalkyl starch.

Also suitable for use in the present compositions may be any cationic starch. A starch of any source may be used as the starch that is rendered cationic. Cationic starches may be produced by any conventional manner. For example, the cationic starches may be produced by a chemical reaction of the starch with a modifying agent containing an amino, imino, ammonium, sulfonium, or phosphonium group. The chemical reaction may be an esterification or etherification reaction. Suitable for use are the primary, secondary, tertiary or quaternary amino groups, with the tertiary amino and quaternary ammonium starch ethers, such as the quaternary amino alkyl ether of starch, more preferred.

An esterified starch may be produced utilizing any conventional manner. For example, any starch source may be reacted with suitable esterifying agents such as, aryl-, alkyl-, alkenyl-, aralkyl-, aralkenyl-anhydrides, aryl-, alkyl-, alkenyl-, aralkyl-, aralkenyl-ester and acid halide derivatives of carboxylic acids, an anhydride, a phosphorous oxyhalide, a phosphorous oxyanhydride, a sulfuryl halide, intramolecular combinations thereof, a polymer mixture thereof, and mixtures thereof. For example, any starch source may be reacted with acetic anhydride to produce an acetylated starch product. Alternatively, suitable modifying agents for esterifying starches such as alkenyl succinic anhydrides, particularly octenyl succinic anhydride may be used. Additionally, inorganic starch esters may be produced utilizing reactive sulfonating, or phosphorylating agents such as phosphorous oxyhalides and phosphorous oxyanhydrides.

The crosslinked starch may be any crosslinked starch. Crosslinked starch may be produced in any conventional manner by the reaction of any starch with any crosslinking agent. The crosslinking component, suitable for use herein, includes, but is not limited to, a multi-functional etherifying agent, a multi-functional esterifying agent, mixtures thereof, and the like. Specific examples of suitable crosslinking agents include, but are not limited to, an aldehyde, a ketone, an epichlorohydrin, a dicarboxylic acid, a phosphorous oxyhalide, an alkali earth metal salt of trimetaphosphate, a phosphorous oxyanhydride that is a metal salt of a linear polyphosphate, a linear mixed anhydride, a polyamido-amine epihalohydrin polymer, mixtures thereof, and the like. The crosslinking reaction may be carried out in any conventional manner such as reacting the starch in an aqueous slurry form with the crosslinking reagent usually in the presence of an activating agent such as sodium hydroxide. Another crosslinking process that may be used is a semi-dry process where the starch is reacted with the crosslinking reagent in the presence of an activating agent such as sodium hydroxide, in a limited amount of water.

The oxidized starch that may be used in the protein-starch compositions of the present disclosure may be any oxidized starch. Oxidized starch may be produced in any conventional manner by the reaction of any starch with any oxidizing agent. Examples of suitable oxidizing agents include metal salts of hypochlorite, metal salts of permanganate, hydrogen peroxide, organic peroxides, peracids, and the like, and mixtures thereof. For example, dent corn starch may be reacted with sodium hypochlorite solution under alkaline pH conditions for a length of time sufficient to achieve a product suitable for use as an oxidized starch.

Any grafted starch interpolymer may be used in the protein-starch compositions of the present disclosure. The grafting of the starch is a chemical modification of the starch. Additionally, in preparing the grafted starch interpolymer, the starch component may be chemically, physically, and/or enzymatically modified at the time of the interpolymerization. The grafted starch interpolymer is produced using any conventional manner for interpolymerizing a starch with one or more monomers or polymers. The one or more components that is interpolymerized with the starch, may be any suitable monomer or polymer.

Exemplary of suitable monomers include, but are not limited to, the following: vinyl monomers such as alkyl acrylates, hydroxylated alkyl acrylates, alkyl methacrylates, hydroxylated alkyl methacrylates, alkyl vinyl ketones, substituted acrylamides, methacrylic acid, crotonic acid, itaconic acid, fumaric acid, maleic acid, maleic anhydride, vinyl halides, vinylidene halides, vinyl esters, vinyl ethers, vinyl carbazole, N-vinyl pyrrolidone, chlorostyrene, alkyl styrene, ethylene, propylene, isobutylene, vinyl triethoxysilane, vinyl diethylmethylsilane, vinyl methyldichlorosilane, triphenyl vinylsilane, 1-vinyl-1-methylsila-14-crown-5. Also suitable for use are dienes such as, 1,3-butadiene, isoprene, chloroprene, cyclobutadiene, divinyl benzene, and mixtures thereof.

The grafted starch interpolymers may be produced utilizing any conventional manner for interpolymerizing a starch with one or more monomers. For example, a starch may be grafted with at least one or more monomer, in the presence of a free radical initiator. The starch utilized herein may be used in any form such as, for example, gelatinizing the starch to form a starch paste, which is thereafter reacted with at least one monomer. Any suitable temperature and/or pressure may be employed in the reaction. Any suitable ratio of the components utilized in preparing the grafted starch interpolymer may be used. Any suitable free radical initiator may be used provided that the free radical initiator acts to interpolymerize and graft the monomers. Exemplary of such initiators are organic and inorganic peroxy compounds, and azo compounds.

Exemplary of suitable polymers include synthetic and natural polymers. Suitable synthetic polymers include, but are not limited to, the following: vinyl polymers such as polymers of alkyl acrylates, hydroxylated alkyl acrylates, alkyl methacrylates, hydroxylated alkyl methacrylates, alkyl vinyl ketones, substituted acrylamides, methacrylic acid, crotonic acid, itaconic acid, fumaric acid, maleic acid, maleic anhydride, vinyl halides, vinylidene halides, vinyl esters, vinyl ethers, vinyl carbazole, N-vinyl pyrrolidone, chlorostyrene, alkyl styrene, ethylene, propylene, isobutylene, vinyl triethoxysilane, vinyl diethylmethylsilane, vinyl methyldichlorosilane, triphenyl vinylsilane, 1-vinyl-1-methylsila-14-crown-5. Also suitable for use are polymers from dienes such as, 1,3-butadiene, isoprene, chloroprene, cyclobutadiene, and divinyl benzene, mixtures thereof, and the like. Exemplary of suitable natural polymers include, but are not limited to, starches, proteins, carageenans, alginates, xanthan gum, locust bean gum, scleroglucan, mixtures thereof, and the like.

The grafted starch interpolymers may also be produced by using any conventional manner for interpolymerizing a starch with one or more polymers. For example, a starch may be grafted onto a pre-formed polymer by means of a crosslinking agent. Alternatively, the polymer may contain reactive groups further polymerizable such as alkenes and alkynes for example. Further, the polymer may contain reactive groups that are reactive toward hydroxyl groups on the starch such as anhydrides, aldehydes, epoxides, and epihalohydrins for example.

Physically modified starches are any starches that are physically treated in any manner to provide physically modified starches. Within physical modification are included, but not limited to, thermal treatment of the starch in the presence of water, thermal treatment of the starch in the absence of water, fracturing the starch granule by any mechanical means, pressure treatment of starch to melt the starch granules, and the like. Physically modified starches may also be prepared by using a combination of any of the physical treatments.

Suitable examples of physically modified starches include the thermal treatment of starch in an aqueous environment to cause the starch granules to swell with or without granule rupture; the thermal treatment of anhydrous or near anhydrous starch granules to cause polymer rearrangement (Dextrinization); fragmentation of the starch granules by mechanical disintegration; and pressure treatment of starch granules by means of an extruder to cause melting of the starch granules.

Enzymatically modified starches are any starches that are enzymatically treated in any manner to provide enzymatically modified starches. Within enzymatic modification are included, but not limited to, the reaction of an alpha amylase with starch, the reaction of a protease with starch, the reaction of a lipase with starch, the reaction of a phosphorylase with starch, the reaction of an oxidase with starch, and the like.

Enzymatically modified starches may be prepared by using a combination of any of the enzymatic treatments. Additionally, the enzymatically modified starches may be prepared by the reaction of the enzyme on a suspension of the starch granules, during the gelatinization of the starch granules, or on the gelatinized paste form of the starch.

Suitable examples of enzymatic modification of starch include the reaction of alpha-amylase enzyme with starch to produce a depolymerized starch; the reaction of alpha amylase de-branching enzyme with starch to produce a de-branched starch; the reaction of a protease enzyme with starch to produce a starch with reduced protein content; the reaction of a lipase enzyme with starch to produce a starch with reduced lipid content; the reaction of a phosphorylase enzyme with starch to produce an enzyme modified phosphated starch; and the reaction of an oxidase enzyme with starch to produce an enzyme oxidized starch.

In another embodiment, the protein of the protein-starch compositions comprise a modified protein. In more detail, at least one of the proteins may be a protein that has been modified by a chemical, physical, or enzymatic modification.

Chemical modification includes any treatment of a protein with a chemical that results in a modified protein. Within chemical modification are included, but not limited to, depolymerization of a protein, oxidation of a protein, reduction of a protein, amidization of a protein, etherification of a protein, esterification of a protein, crosslinking of a protein, defatting of a protein, hydrophobization of a protein, grafting of a protein with a reactive monomer or another reactive polymer to form a grafted protein interpolymer, and the like. Chemically modified proteins may also be prepared by using a combination of any of the chemical treatments.

Suitable examples of chemically modified proteins include the reaction of acids or bases to depolymerize the protein; the reaction of alkenyl succinic anhydride, particularly octenyl succinic anhydride, with protein to produce a hydrophobic esterified protein; the reaction of 2,3-epoxypropyltrimethylammonium chloride with protein to produce an etherified cationic protein; the reaction of ethylene oxide with protein to produce an etherified hydroxyethyl protein; the reaction of hypochlorite with protein to produce an oxidized protein; the reaction of an acid with protein to produce an acid depolymerized protein; defatting of a protein with a solvent such as methanol, ethanol, propanol, hexane, methylene chloride, chloroform, carbon tetrachloride, and the like, to produce a defatted starch; the reaction of acrylic acid with protein in the presence of a polymerization initiator to produce a grafted protein interpolymer.

An acid or base depolymerized protein may be produced utilizing any conventional manner. Depolymerized proteins may be used in the present compositions. For example, acid, such as a mineral acid, may be added to protein usually as an aqueous slurry to which heat has been applied, to produce an acid depolymerized protein. Similarly, a base, such as sodium hydroxide, may be added usually as an aqueous slurry to which heat has been applied, to produce a base depolymerized protein.

An etherified protein may be produced utilizing any conventional manner. Hydroxyalkyl proteins that may be used in the present compositions, such as hydroxyethyl starch, hydroxypropyl starch, and hydroxybutyl protein may be produced by any conventional manner. For example, hydroxyethyl protein may be produced by the reaction of any protein with ethylene oxide. Similarly, hydroxypropyl protein may be produced by the reaction of any protein with propylene oxide. In both instances, the protein is treated with the alkylene oxide, under alkaline pH conditions, for a length of time sufficient to achieve a product suitable for use as a hydroxyalkyl protein.

Suitable for use in the present compositions may be any cationic protein. A protein of any source may be used as the protein that is rendered cationic. Cationic proteins may be produced by any conventional manner. For example, the cationic proteins may be produced by a chemical reaction of the protein with a modifying agent containing an amino, imino, ammonium, sulfonium, or phosphonium group. The chemical reaction may be an amidation, esterification, or etherification reaction. Suitable for use are the primary, secondary, tertiary or quaternary amino groups, with the tertiary amino and quaternary ammonium reacted proteins, such as the quaternary amino alkyl reacted proteins, more preferred. If desired, the cationic protein may be treated in any conventional manner with known treating agents to render the cationic proteins hydrophobized.

An amidized protein may be produced utilizing any conventional manner. For example, any protein source may be reacted with suitable amidizing agents such as, aryl-, alkyl-, alkenyl-, aralkyl-, aralkenyl-anhydrides, aryl-, alkyl-, alkenyl-, aralkyl-, aralkenyl-ester and acid halide derivatives of carboxylic acids, ammonia, primary amines, secondary amines, intramolecular combinations thereof, and mixtures thereof. For example, any protein source may be reacted with acetic anhydride to produce an acetylated protein product. Alternatively, suitable modifying agents for amidizing proteins such as alkenyl succinic anhydrides, particularly octenyl succinic anhydride may be used. Additionally, inorganic protein amides or may be produced utilizing reactive sulfonating or phosphorylating agents.

An esterified protein may be produced utilizing any conventional manner. For example, any protein source may be reacted with suitable esterifying agents such as, aryl-, alkyl-, alkenyl-, aralkyl-, aralkenyl-anhydrides, aryl-, alkyl-, alkenyl-, aralkyl-, aralkenyl-ester and acid halide derivatives of carboxylic acids, intramolecular combinations thereof, and mixtures thereof. In particular, any protein source may be reacted with acetic anhydride to produce an acetylated protein product. Alternatively, suitable modifying agents for esterifying proteins such as alkenyl succinic anhydrides, particularly octenyl succinic anhydride may be used. Additionally, inorganic protein esters may be produced utilizing reactive sulfonating or phosphorylating agents.

The crosslinked protein that may be used in the protein-starch compositions of the present disclosure may be any crosslinked protein. Crosslinked protein may be produced in any conventional manner by the reaction of any starch with any crosslinking agent. The crosslinking component, suitable for use herein, includes but is not limited to, a multi-functional etherifying agent, a multi-functional esterifying agent, mixtures thereof, and the like. Specific examples of suitable crosslinking agents include, but are not limited to, an aldehyde, a ketone, an epichlorohydrin, a dicarboxylic acid, a phosphorous oxyhalide, an alkali earth metal salt of trimetaphosphate, a phosphorous oxyanhydride that is a metal salt of a linear polyphosphate, a linear mixed anhydride, a polyamido-amine epihalohydrin polymer, mixtures thereof, and the like. The crosslinking reaction may be carried out in any conventional manner such as reacting the starch in an aqueous slurry form with the crosslinking reagent usually in the presence of an activating agent such as sodium hydroxide. Another crosslinking process that may be used is a semi-dry process where the protein is reacted with the crosslinking reagent in the presence of an activating agent such as sodium hydroxide, in a limited amount of water.

The oxidized protein that may be used in the protein-starch compositions of the present disclosure may be any oxidized protein. Oxidized protein may be produced in any conventional manner by the reaction of any protein with any oxidizing agent. Examples of suitable oxidizing agents include metal salts of hypochlorite, metal salts of permanganate, hydrogen peroxide, organic peroxides, peracids, and the like, and mixtures thereof. For example, soy protein may be reacted with sodium hypochlorite solution under alkaline pH conditions for a length of time sufficient to achieve a product suitable for use as an oxidized protein.

Any grafted protein interpolymer may be used in the protein-starch compositions of the present disclosure. The grafting of the protein is a chemical modification of the protein. Additionally, in preparing the grafted protein interpolymer, the protein component may be chemically, physically, and/or enzymatically modified at the time of the interpolymerization. The grafted protein interpolymer is produced using any conventional manner for interpolymerizing a protein with one or more monomers. The one or more components that is interpolymerized with the protein, may be any suitable monomer. Exemplary of suitable monomers include, but are not limited to, the following: vinyl monomers such as alkyl acrylates, hydroxylated alkyl acrylates, alkyl methacrylates, hydroxylated alkyl methacrylates, alkyl vinyl ketones, substituted acrylamides, methacrylic acid, crotonic acid, itaconic acid, fumaric acid, maleic acid, maleic anhydride, vinyl halides, vinylidene halides, vinyl esters, vinyl ethers, vinyl carbazole, N-vinyl pyrrolidone, chlorostyrene, alkyl styrene, ethylene, propylene, isobutylene, vinyl triethoxysilane, vinyl diethylmethylsilane, vinyl methyldichlorosilane, triphenyl vinylsilane, 1-vinyl-1-methylsila-14-crown-5. Also suitable for use are dienes such as, 1,3-butadiene, isoprene, chloroprene, cyclobutadiene, and divinyl benzene.

The grafted protein interpolymers may be produced utilizing any conventional manner. For example, a protein may be grafted with at least one or more monomer, in the presence of a free radical initiator. The protein utilized herein may be used in any form such as, for example, heating of the protein in water to form a protein paste, which is thereafter reacted with at least one monomer. Any suitable temperature and/or pressure may be employed in the reaction. Any suitable ratio of the components utilized in preparing the grafted protein interpolymer may be used. Any suitable free radical initiator may be used provided that the free radical initiator acts to interpolymerize and graft the monomers. Exemplary of such initiators are organic and inorganic peroxy compounds, and azo compounds.

The grafted protein interpolymers may also be produced by using any conventional manner for interpolymerizing a protein with one or more polymers. For example, a protein may be grafted onto a pre-formed polymer by means of a crosslinking agent. Alternatively, the polymer may contain reactive groups further polymerizable such as alkenes and alkynes for example. Further, the polymer may contain reactive groups that are reactive toward carboxyl, amino, amido, and hydroxyl groups on the protein such as anhydrides, aldehydes, epoxides, and epihalohydrides for example. Particularly useful as a polymer to form grafted protein interpolymers, are polyamido-amine epichlorohydrin polymers.

Physically modified proteins are any proteins that are physically treated in any manner to provide physically modified proteins. Within physical modification are included, but not limited to, thermal treatment of the protein in the presence of water, thermal treatment of the protein in the absence of water, pressure treatment of protein to melt the protein, and the like. Physically modified proteins may also be prepared by using a combination of any of the physical treatments.

Suitable examples of physically modified proteins include the thermal treatment of protein in an aqueous environment to cause the denaturing of the protein; the thermal treatment of anhydrous or near anhydrous protein to cause polymer rearrangement; and pressure treatment of protein by means of an extruder to cause melting of the protein.

Enzymatically modified proteins are any proteins that are enzymatically treated in any manner to provide enzymatically modified proteins. Within enzymatic modification are included, but not limited to, the reaction of a protease with protein, the reaction of a lipase with protein, the reaction of a phosphorylase with protein, the reaction of an oxidase with protein, and the like. Enzymatically modified proteins may be prepared by using a combination of any of the enzymatic treatments.

Suitable examples of enzymatic modification of protein include the reaction of a protease enzyme with protein to produce a depolymerized protein; the reaction of a lipase enzyme with protein to produce a protein with reduced lipid content; the reaction of a phosphorylase enzyme with protein to produce an enzyme modified phosphated protein; and the reaction of an oxidase enzyme with protein to produce an enzyme oxidized protein.

The following examples are presented to illustrate the present disclosure and to assist one of ordinary skill in making and using the same. The examples are not intended in any way to otherwise limit the scope of the disclosure.

EXAMPLES

The following test procedures are utilized in evaluating the properties of the products, and the application of the products, provided in the examples.
Test Procedures
General Preparation of Adhesives Protein-Starch mixtures were prepared dry, as slurries, or as heat-treated aqueous liquids. In the dry preparation for example, the protein and starch were weighed on a weighing balance accurate to 0.01 g and the dry mixture was added slowly to pre-heated water contained in a 750-ml metal beaker secured in a hot water bath. Mechanical agitation was provided by a Lightning mixer with an implosion-type blade design. The mixture was stirred and heating continuously to the indicated time.

Alternatively, the protein and starch samples were dispersed in water individually and the water suspensions were combined as desired.

Alternatively, the protein and starch samples were dispersed in water individually and the samples were then heated to, in the case of starch, the gelatinization temperature, and in the case of protein, the denaturation temperature. The samples were then combined to form the adhesive.
Application of Adhesive Formulation 2-inch lines were drawn on standard 6×⅝ inch (15×1.75 cm) Tongue Depressors (Crosstex). The calculated area from the end of the tongue depressor to the 2-inch line is equivalent to 1 square inch. Adhesive pastes from the following Examples were added to the tongue depressor starting at the 2-inch line and coating to the end of the depressor to an approximate depth of ⅛ of an inch. Samples of the depressor with adhesive were placed on a square of standard TAPPI blotter paper and this placed on the bottom platen of a standard TAPPI handsheet press (Noram, Ponte Clare, Quebec, Canada). A second tongue depressor was placed on top of each of the depressors coated with the adhesive such that the 2-inch marking lines matched to the edge of the rounded depressor edge. A second blotter paper square was placed on the sample set and the top platen of the handsheet press was added and secured with the quick screw bolts. The samples were pressed for 5.5 minutes at a pressure of 60 psi. This was considered the wet press cycle. After the wet press cycle, the samples were removed from the handsheet press and placed on an Emerson Speed Dryer (Emerson Apparatus, Portland, Me.) set at a temperature of 250° F. On top of the Speed Dryer lid was placed a 30 lb weight and the samples were hot pressed for 15 minutes. This was considered the hot press cycle. After 15 minutes, the samples were removed from the Speed Dryer and set aside to cool and equilibrate for a minimum of 30 minutes. The excess adhesive on the edges of the test strips was removed before testing. Individual samples were then tested for breaking strength by the method described below.
Strength Test of Adhesive Formulations An adhesive strength test of our own design was used to evaluate the binding power of the different compositions. An electric motor connected to an electronic controller with a digital display (ElectroCraft®, Model Motomatic II, Reliance Motion Control, Inc., Eden Prairie, Minn.), was fitted with a ¼ inch shaft (motor drive). A 3-inch diameter rubber O-ring connected this shaft onto another drive shaft/bearing assembly (stationary drive) with a 1.5-inch pulley. To this shaft was fastened one end of a 15-inch nylon cord with a secured loop in the free end of the cord. The motor speed was adjusted so that the 1.5-inch pulley rotated at 30 rpm. Test samples of the glued tongue depressors were secured at the ends by a horizontal, U-shaped platen. The looped end of the nylon cord was placed around test strip at the center of the glued area. This allowed the center of the test sample to be pulled freely by the loop of the nylon cord attached to the electric motor while the edges of the test strips were secured by the horizontal, U-shaped platen. The tension of the O-ring was adjusted by raising or lowering the motor drive relative to the stationary drive to give a blank reading on the activated motor of 6.5-7.5 inch-ounces. A no-load blank was performed before a series of test strip evaluations and the average reading was recorded. In order to measure the test sample, the motor was started and a few inches of the cord was allowed to be pulled in order to get an equilibrium reading on the torque display. As the cord became taut due to the resistance of the glued test sample, the digital display indicated a rise in torque placed on the motor. The torque display was monitored until the test sample broke at the center, and the maximum torque reading was recorded. A minimum of five test samples were produced and measured for strength for each condition, and the average values were recorded. The no-load blank reading was subtracted from the average of the five test strip readings.
Viscosity Determination Viscosity measurements were determined on a Brookfield Viscometer, Model RV DV-I+ (Brookfield Engineering Labs, Inc., Middleboro, Mass.), using a standard spindle set at either 10 or 20 rpm. Measurements were taken at a sample temperature of 50° C. Test samples were equilibrated to 50° C. and the spindle was immersed in the sample to the mark indicated on the spindle shaft. Spindle and RPM were recorded for each determination, and readings were taken after 10 seconds of shear time.

Example 1

Preparation of a 100% Soy Flour Protein Adhesive

In this example there was used Prolia 200/20 soy protein flour available from Cargill, Inc. 80 g of Prolia 200/20 was weighed into a plastic weighing boat on a top loading balance and the dry powder was added slowly with stirring to 195 mL of de-ionized water warmed in a metal beaker inserted into a hot water bath set to 53° C. This was mixed for 15 minutes. The protein paste product was then transferred to a sealable bottle and placed in a warm water bath at 50° C.

Example 2

Preparation of 75:25 Soy Flour Protein and a Thermally Modified Dent Corn Starch Dextrin Adhesive In this example there was used 200/20 Prolia soy protein flour and DrySet 08501 starch dextrin available from Cargill, Inc. 60 g of Prolia 200/20 and 20 g of DrySet 08501 were combined dry in a weighing boat. The protein-starch dry powder blend was added slowly with stirring to 195 mL of de-ionized water warmed in a metal beaker inserted into a hot water bath set to 53° C. This was mixed for 15 minutes. The protein-starch paste product was then transferred to a sealable bottle and placed in a warm water bath at 50° C.

Example 3

Preparation of a 50:50 Soy Flour Protein and a Thermally Modified Dent Corn Starch Dextrin Adhesive In this example there was used 200/20 Prolia soy protein flour and DrySet 08501 starch dextrin. 40 g of Prolia 200/20 and 40 g of DrySet 08501 were combined dry in a weighing boat. The protein-starch dry powder blend was added slowly with stirring to 195 mL of de-ionized water warmed in a metal beaker inserted into a hot water bath set to 53° C. This was mixed for 15 minutes. The protein-starch paste product was then transferred to a sealable bottle and placed in a warm water bath at 50° C.

Example 4

Preparation of a 25:75 Soy Flour Protein and a Thermally Modified Dent Corn Starch Dextrin Adhesive In this example there was used 200/20 Prolia soy protein flour and DrySet 08501 starch dextrin. 20 g of Prolia 200/90 and 60 g of DrySet 08501 were combined dry in a weighing boat. The protein-starch dry powder blend was added slowly with stirring to 195 mL of de-ionized water warmed in a metal beaker inserted into a hot water bath set to 53° C. This was mixed for 15 minutes. The protein-starch paste product was then transferred to a sealable bottle and placed in a warm water bath at 50° C.

Example 5

Preparation of a 100% Thermally Modified Dent Corn Starch Dextrin Adhesive

In this example there was used DrySet 08501 starch dextrin. 80 g of DrySet 08501 was weighed into a plastic weighing boat on a top loading balance and the dry powder was added slowly with stirring to 195 mL of de-ionized water warmed in a metal beaker inserted into a hot water bath set to 53° C. This was mixed for 15 minutes. The dextrin paste product was then transferred to a sealable bottle and placed in a warm water bath at 50° C.

Example 6

Viscosity and Adhesive Strength Evaluation of Examples 1-5

The prepared samples from Examples 1-5 were measured for viscosity and dry strength properties. The adhesive samples from Examples 1-5 were maintained at a temperature of 50° C. in a water bath before use. Generally, the sample viscosity was measured, and the strength test strips were prepared within 15 minutes of adhesive preparation. Viscosity measurements were performed on a Brookfield Viscometer (DV-I+) using spindle #6, at a measuring speed of 20 rpm. Measurements were recorded after 10 seconds of shear from the viscometer spindle.

Five test strips were prepared for adhesive strength evaluation with each of the adhesive samples in Examples 1-5 utilizing the Application of Adhesive Method as described. The adhesive strength determinations were made utilizing the Strength Test Method as described. After a no-load blank force was measured, the five test strips from each Example were measured for breaking force, and averaged. The no-load blank force was then subtracted from the breaking force average for each Example and reported as the Breaking Force.

The results of Examples 1-5 are compiled in the Table 1 below.

TABLE 1

| Sample | Viscosity (cps) | No Load Force (in-oz) | Average Force (in-oz) | Breaking Force (in-oz) |
|---|---|---|---|---|
| Example 1 | 40,150 | 7.0 | 11.34 | 4.34 |
| Example 2 | 5,300 | 7.0 | 11.03 | 4.03 |
| Example 3 | 2,350 | 7.0 | 8.84 | 1.84 |
| Example 4 | 2,000 | 7.0 | 9.40 | 2.42 |
| Example 5 | 1,100 | 7.0 | 9.66 | 2.66 |

From the data in Table 1 the following is observed. As starch dextrin is added to the soy protein, a precipitous drop in viscosity is measured. Also noted is that in starch dextrin additions up to 25% of the protein-starch composition in the adhesive formulations, good breaking force of the adhesive is maintained. As more starch dextrin is incorporated, the breaking force decreases until 75% or greater of the protein-starch composition comprises the starch dextrin. From about 75% to 100% of the starch dextrin incorporation to the protein-starch composition, the breaking force again increases. Presumably, this is an indication of two different adhesion mechanisms for the components of the composition.

It is anticipated that the protein-starch compositions would have improved runnability in commercial adhesive applicators due to the lower viscosity formulations. Alternatively, higher solids levels of the formulations could be achieved due to the lower viscosity levels of the protein-starch compositions.

Example 7

Preparation of a Protein-Starch Adhesive at High Solids with an Enzyme Modified Soy Flour Protein and Thermally Modified Dent Corn Starch Dextrin In this example there was used 200/20 Prolia soy protein flour and Stadex 90 dent corn starch dextrin available from Tate & Lyle, PLC. 78.75 g of Prolia 200/90 and 26.25 g of Stadex 90 were combined dry in a weighing boat. The protein-starch dry powder blend was added slowly with stirring to 195 mL of de-ionized water warmed in a metal beaker inserted into a hot water bath set to 53° C. This was mixed for 15 minutes. The metal beaker containing the protein-starch paste product was removed and a viscosity measurement was taken with a Brookfield Viscometer DV-I+ using spindle #7 at a measuring speed of 20 rpm. Measurements were recorded after 10 seconds of shear from the viscometer spindle. The metal beaker containing the protein-starch paste product was re-inserted into the hot water bath and stirring continued. To the stirring protein-starch paste was added sequentially, 75 µL each of Alcalase and Neutrase protease enzymes available from Novozymes, Inc. The enzyme reaction was continued for 5 minutes. To the now modified protein-starch paste product was then added 105 g of reagent grade urea available from Sigma-Aldrich, and the mixing continued for an additional 5 minutes. The modified protein-starch paste adhesive formulation at high solids was then transferred to a sealable bottle and placed in a warm water bath at 50° C. After 5 minutes viscosity was again measured with the Brookfield Viscometer using spindle #7 at 20 rpm. The viscosity was recorded after 10 seconds of shear from the viscometer spindle. The comparative results of the experiment are recorded in Table 2.

TABLE 2

| Time | Viscosity (cps) | % Solids |
|---|---|---|
| Initial Protein-Starch | 38,800 | 35.0 |
| Modified Protein-Starch (with urea to raise total solids content) | 35,000 | 51.8 |

From the data in Table 2, the following is observed. A high solids adhesive formulation of greater than 50% may be achieved by modifying the protein of the protein-starch composition to give a viscosity similar to a lower solids protein-starch adhesive formulation.

Example 8

Preparation of a Protein-Starch Adhesive with a Thermally Modified Protein and a Chemically Modified Waxy Corn Starch Ester In this example there was used Prolia 200/20 soy protein flour and EmCap 06375 n-Octenyl Succinic Anhydride ester modified waxy corn starch available from Cargill, Inc. 80 g of a 25:75 mixture of 200/20 soy protein flour and Cargill EmCap 06375 ester modified waxy corn starch were combined dry in a weighing boat. The protein-starch dry powder product was added slowly with stirring to 195 mL of de-ionized water heated in a metal beaker inserted into a hot water bath set to 95° C. This was mixed for 15 minutes. The protein-starch paste product was then transferred to a sealable bottle and placed in a warm water bath at 50° C. The viscosity and adhesive strength test determinations were performed after the sample had cooled to 50° C. The viscosity of the protein-starch paste product was recorded on a Brookfield Viscometer DV-I+ using spindle #7 at a measuring speed of 20 rpm. The viscosity was recorded after 10 seconds of shear from the viscometer. Five test strips were prepared for adhesive strength evaluation as in the prescribed method above and measured on the digital torque display assembly. The no-load blank torque was averaged at 7.0 in-oz. The viscosity of the protein-starch paste product and results of the adhesive strength test are recorded in Table 3.

TABLE 3

| Sample | Viscosity (cps) | No Load Force (in-oz) | Average Force (in-oz) | Breaking Force (in-oz) |
|---|---|---|---|---|
| Example 8 | 32,400 | 7.0 | 9.71 | 2.71 |

From the data in Table 3 the following is observed. A thermally modified protein and a chemically modified starch may be combined to form an adhesive comprising the protein-starch composition with good viscosity and breaking force characteristics.

Example 9

Preparation of a Protein-Starch Adhesive With a Thermally Modified Soy Protein and a Chemically Modified Oxidized Wheat Starch In this example is used Prolia 200/20 soy protein flour and a sodium hypochlorite oxidized wheat starch (Wheatsize, available from Archer-Daniels Midland, Inc.). 65 g of a mixture of 48.75 g 200/20 soy flour, and 16.25 g of ADM's Wheatsize 1884-C was combined dry in a weighing boat. The protein-starch dry powder blend was added slowly with stirring to 195 mL of de-ionized water heated in a metal beaker inserted into a hot water bath set to 95° C. This was mixed for 20 minutes. The protein-starch paste product was then transferred to a sealable bottle and placed in a warm water bath at 50° C. The viscosity and adhesive strength test determinations were performed after the sample had cooled to 50° C. The viscosity of the protein-starch paste product was recorded on a Brookfield Viscometer DV-I+ using spindle #7 at a measuring speed of 20 rpm. The viscosity was recorded after 10 seconds of shear from the viscometer. Five test strips were prepared for adhesive strength evaluation as in the prescribed method above and measured on the digital torque display assembly. The no-load blank torque was averaged at 7.5 in-oz. The viscosity of the protein-starch paste product and results of the adhesive strength test are recorded in Table 4.

TABLE 4

| Sample | Viscosity (cps) | No Load Force (in-oz) | Average Force (in-oz) | Breaking Force (in-oz) |
|---|---|---|---|---|
| Example 9 | 100,000 | 7.5 | 9.61 | 2.11 |

From the data in Table 4 the following is observed. A thermally modified protein and a chemically modified starch may be combined to form an adhesive comprising the protein-starch composition with good breaking force characteristics.

Example 10

Preparation of an Protein-Starch Adhesive with a Thermally Modified Soy Protein and a Chemically Modified Waxy Corn Starch Ether In this example is used Prolia 200/20 soy protein flour and a chemically modified cationic waxy corn starch ether Charge+39 available from Cargill, Inc. 80 g of a 75:25 mixture of 200/20 soy protein flour and Charge+39 cationic ether modified starch was combined dry in a weighing boat. The protein-starch dry powder product was added slowly with stirring to 195 mL of de-ionized water heated in a metal beaker inserted into a hot water bath set to 95° C. This was mixed for 20 minutes. The protein-starch paste product was then transferred to a sealable bottle and placed in a warm water bath at 50° C. The viscosity and adhesive strength test determinations were performed after the sample had cooled to 50° C. The viscosity of the protein-starch paste product was recorded on a Brookfield Viscometer DV-I+ using spindle #7 at a measuring speed of 20 rpm. The viscosity was recorded after 10 seconds of shear from the viscometer. Five test strips were prepared for adhesive strength evaluation as in the prescribed method above and measured on the digital torque display assembly. The no-load blank torque was averaged at 7.0 in-oz. The viscosity of the protein-starch paste product and results of the adhesive strength test are recorded in Table 5.

TABLE 5

| Sample | Viscosity (cps) | No Load Force (in-oz) | Average Force (in-oz) | Breaking Force (in-oz) |
|---|---|---|---|---|
| Example 10 | 51,400 | 7.0 | 9.16 | 2.16 |

From the data in Table 5 the following is observed. A thermally modified protein and a chemically modified starch may be combined to form an adhesive comprising the protein-starch composition with good breaking force characteristics.

Example 11

Preparation of an Adhesive with 90 PDI Soy Protein Flour and a Chemically Modified Starch Ether in a Paste Form In this example is used Prolia 100/90 soy protein flour available from Cargill, Inc. A 20% solids sample of 100/90 was prepared by weighing 49 g of Prolia 100/90 into a plastic weighing boat on a top loading balance, and the dry powder was added slowly with stirring to 195 mL of de-ionized water warmed in a metal beaker inserted into a hot water bath set to 53° C. This was mixed for 15 minutes. The resultant protein paste product was then transferred to a sealable bottle and placed in a warm water bath at 50° C.

In a separate preparation was used K-96 hydroxyethyl dent corn starch available from Grain Processing Corporation. A starch paste of hydroxyethyl dent corn starch was prepared by weighing 92 g of the K-96 dry powder into a plastic weighing boat on a top loading balance. The dry powder was added slowly with stirring to 195 ml of de-ionized water heated in a metal beaker inserted into a hot water bath set to 95° C. This was mixed for 20 minutes to achieve a starch paste. The starch paste product was removed from heating and transferred to a sealable bottle and placed in a warm water bath at 50° C.

The soy protein paste and the hydroxyethyl dent corn starch paste were combined to form a protein-starch adhesive composition by adding 30 g of the K-96 starch paste to 100 g of the soy protein paste. This produced a protein-starch product with a blend ratio of approximately 2 parts soy protein to 1 part chemically modified starch ether, for an overall 23% solids adhesive formulation. Five test strips were prepared for adhesive strength evaluation as in the prescribed method above and measured on the digital torque display assembly. The no-load blank torque was averaged at 7.0 in-oz. The results of the adhesive strength test are recorded in Table 6.

TABLE 6

| Sample | No Load Force (in-oz) | Average Force (in-oz) | Breaking Force (in-oz) |
|---|---|---|---|
| Prolia 100/90 | 7.0 | 9.40 | 2.40 |
| Prolia/K-96 | 7.0 | 10.00 | 3.00 |

From the data in Table 6 the following is observed. A soy protein and a chemically modified starch ether may be combined in the paste form to produce an adhesive comprising the protein-starch composition with good breaking force characteristics.

Example 12

Preparation of a Protein-Starch Adhesive with Corn Zein Protein and a Chemically Modified Starch Ester In this example there was used corn zein protein and EmCap 12633 chemically modified waxy corn starch modified with n-Octenyl Succinic Anhydride, available from Cargill, Inc. 40 g of Corn Zein Protein and 40 g of EmCap 12633 were combined dry in a weighing boat. The protein-starch dry powder blend was added slowly with stirring to 195 mL of de-ionized water warmed in a metal beaker inserted into a hot water bath set to 53° C. This was mixed for 15 minutes. The corn zein protein separated from the water phase into a stringy dough. The protein-starch paste product was then transferred to a sealable bottle and placed in a warm water bath at 50° C. but there was no option to perform a viscosity measurement due to the stringy nature of the product. Five test strips were prepared for adhesive strength evaluation as in the prescribed method above and measured on the digital torque display assembly. The no-load blank torque was averaged at 7.5 in-oz. The results of the adhesive strength test are recorded in Table 7.

TABLE 7

| Sample | No Load Force (in-oz) | Average Force (in-oz) | Breaking Force (in-oz) |
|---|---|---|---|
| Corn Zein/starch | 7.5 | 11.58 | 4.08 |

From the data in Table 7 the following is observed. A corn protein and a chemically modified starch may be combined in the paste form to produce an adhesive comprising the protein-starch composition with good breaking force characteristics.

Example 14

Preparation of a Protein-Starch Adhesive with Linseed Protein Meal and a Thermally Modified Dent Corn Starch In this example there was used linseed protein meal available from Cargill, Inc., and a thermally modified dent corn starch DrySet 08501 dextrin. 56 g of linseed protein meal and with 24 g of DrySet 08501 starch dextrin were combined in a plastic weighing boat on a top loading balance, and the dry powder was added slowly with stirring to 195 mL of de-ionized water warmed in a metal beaker inserted into a hot water bath set to 53° C. This was mixed for 15 minutes. The resultant protein-starch paste product was then transferred to a sealable bottle and placed in a warm water bath at 50° C. The viscosity of the protein-starch paste product was recorded on a Brookfield Viscometer DV-I+ using spindle #7 at a measuring speed of 20 rpm. The viscosity was recorded after 10 seconds of shear from the viscometer. Five test strips were prepared for adhesive strength evaluation as in the prescribed method above and measured on the digital torque display assembly. The no-load blank torque was averaged at 7.0 in-oz. The viscosity of the protein-starch paste product and results of the adhesive strength test are recorded in Table 8.

TABLE 8

| Sample | Viscosity (cps) | No Load Force (in-oz) | Average Force (in-oz) | Breaking Force (in-oz) |
|---|---|---|---|---|
| Example 14 | 38,400 | 7.5 | 9.73 | 2.23 |

From the data in Table 8 the following is observed. A thermally modified linseed protein and a thermally modified starch may be combined to form an adhesive comprising the protein-starch composition with good viscosity and breaking force characteristics.

Example 15

Preparation of a Protein-Starch Adhesive with Sunflower Protein Meal and a Thermally Modified Dent Corn Starch In this example there was used sunflower protein meal available from Cargill, Inc., and a thermally modified dent corn starch DrySet 08501 dextrin. 56 g of sunflower protein meal and with 24 g of DrySet 08501 starch dextrin were combined in a plastic weighing boat on a top loading balance, and the dry powder was added slowly with stirring to 195 mL of de-ionized water warmed in a metal beaker inserted into a hot water bath set to 53° C. This was mixed for 15 minutes. The resultant protein-starch paste product was then transferred to a sealable bottle and placed in a warm water bath at 50° C. The viscosity of the protein-starch paste product was recorded on a Brookfield Viscometer DV-I+ using spindle #7 at a measuring speed of 20 rpm. The viscosity was recorded after 10 seconds of shear from the viscometer. Five test strips were prepared for adhesive strength evaluation as in the prescribed method above and measured on the digital torque display assembly. The no-load blank torque was averaged at 6.5 in-oz. The viscosity of the protein-starch paste product and results of the adhesive strength test are recorded in Table 9.

TABLE 9

| Sample | Viscosity (cps) | No Load Force (in-oz) | Average Force (in-oz) | Breaking Force (in-oz) |
| --- | --- | --- | --- | --- |
| Example 15 | 7,800 | 6.5 | 6.71 | 0.21 |

From the data in Table 9 the following is observed. A thermally modified sunflower protein and a thermally modified starch may be combined to form an adhesive comprising the protein-starch composition with good viscosity characteristics but poor breaking force characteristics.

Example 16

Preparation of a Protein-Starch Adhesive with Canola Protein Meal and a Thermally Modified Dent Corn Starch In this example there was used canola protein meal available from Cargill, Inc., and a thermally modified dent corn starch DrySet 08501 dextrin. 56 g of canola protein meal and with 24 g of DrySet 08501 starch dextrin were combined in a plastic weighing boat on a top loading balance, and the dry powder was added slowly with stirring to 195 mL of de-ionized water warmed in a metal beaker inserted into a hot water bath set to 53° C. This was mixed for 15 minutes. The resultant protein-starch paste product was then transferred to a sealable bottle and placed in a warm water bath at 50° C. The viscosity of the protein-starch paste product was recorded on a Brookfield Viscometer DV-I+ using spindle #7 at a measuring speed of 20 rpm. The viscosity was recorded after 10 seconds of shear from the viscometer. Five test strips were prepared for adhesive strength evaluation as in the prescribed method above and measured on the digital torque display assembly. The no-load blank torque was averaged at 6.5 in-oz. The viscosity of the protein-starch paste product and results of the adhesive strength test are recorded in Table 10.

TABLE 10

| Sample | Viscosity (cps) | No Load Force (in-oz) | Average Force (in-oz) | Breaking Force (in-oz) |
| --- | --- | --- | --- | --- |
| Example 16 | 1,800 | 6.5 | 6.95 | 0.45 |

From the data in Table 10 the following is observed. A thermally modified canola protein and a thermally modified starch may be combined to form an adhesive comprising the protein-starch composition with good viscosity characteristics but poor breaking force characteristics.

Example 17

Preparation of a Paper Coating Formulation Containing a Protein-Starch Binder Composition In this example there was prepared a paper coating color formulation comprising of the follow components: a pigment mixture, a synthetic latex binder, a natural biopolymer binder, a water retention agent, and a lubricant. In this example, the natural biopolymer binder was comprised of a dry powder blend of a soy protein isolate and a 80% water soluble corn starch dextrin.

A paper coating color was prepared utilizing 80 parts of a 60% solids delaminated clay suspension and 20 parts of a 70% solids precipitated calcium carbonate suspension. To a 1-liter mixture of the two pigment suspensions with stirring, was added 10 parts of a 65% solids latex suspension. This was followed by the addition of 5 parts of a 70:30 blend of soy protein isolate and corn starch dextrin dispersed in water as a 35% solids mixture. 0.5 parts of 10% solids solution of carboxymethyl cellulose was then added, followed by 0.1 parts addition of calcium stearate as a lubricant. The paper coating color continued to be stirred until a homogenous mixture was achieved.

The paper coating color was applied to a standard #5 light weight coated base paper utilizing a laboratory scale blade paper coater and the coating dried to a uniform moisture level.

It is anticipated, that the paper coating color of the present invention would have superior binding characteristics as compared to a paper coating color that utilized a 100% dextrin as the natural binder component. It is also anticipated that the paper coating color of the present invention would have a lower viscosity than a paper coating color prepared utilizing a 100% soy protein isolate as the natural binder.

Example 18

Figure 1:
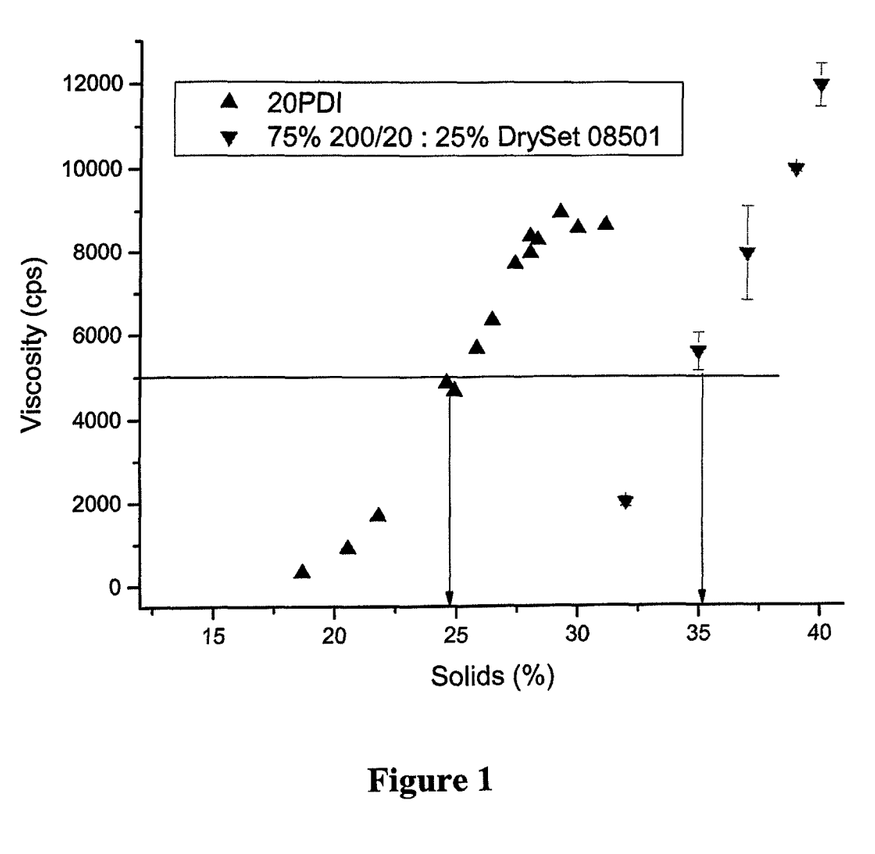
FIG. 1 illustrates the effect a higher solids content of a binder composition comprising a soy flour and dextrin starch has on viscosity.

Solids Content of a Binder Composition Comprising a Soy Flour and Dextrin Starch To illustrate the advantage of blending soy flour and dextrin, a mixture was prepared comprising 75% Prolia 200-mesh 20PDI soy flour and 25% DrySet 08501 corn dextrin. This mixture was dispersed in water at different concentrations and the viscosity was measured. As shown by FIG. 1, much higher solids could be achieved at the same viscosity than with the soy flour component alone.

Example 19

Viscosity of a Binder Composition Comprising a Soy Flour and Dextrin Starch

Blends of soy flour and dextrin were made using a mixture-type experimental design. The soy flours were Prolia 200/20, Prolia 200/70 and Prolia 200/90, and the dextrin was DrySet 08501, all available from Cargill, Incorporated. The viscosity of approx. 27% dispersions (as is) in water was measured. Components of the mixtures were separately weighed out and combined to total 8 g, then added to a RVA canister. Two drops of Patcote 376K antifoam were added and the dispersion was brought to 30 g with deionized water. The dispersion was hand mixed and allowed to hydrate for about 10 minutes with a RVA paddle placed in the canister. The canister was then mounted on the RVA (Rapid Viscometry Analyzer, . . . ) and the viscosity in centipoise was measured at a constant temperature of 25 C and using a profile where for 2 minutes the paddle speed was 960 rpm followed by 8 minutes at 160 rpm. The viscosity was recorded after 10 minutes. For demonstration purposes, the compositions are expressed as the percent of component in the mix, where the final dispersion contains 8 g of mixture (as is) per 30 g dispersion. The resulting viscosities were analyzed using Design Expert™ 5 software. The equation resulting from backward regression is shown below and had $r^2=0.976$.

Viscosity=(17.65*200/90)+(21.92*200/70)+
(49.37*200/20)+(0.51*DrySet)−(0.72*200/
90*200/20)−(0.22*200/90*DrySet)−(0.48*200/
70*200/20)−(0.32*200/70*DrySet)−(0.87*200/
20*DrySet)

For illustrative purposes, the predicted viscosity for a series of binary compositions of soy flour with dextrin was computed, with the results shown in Table 11. Water, measured under the conditions described above gives a viscosity reading of about 70, so predicted values near or below 70 should be considered as indicating viscosities equivalent to water alone.

As indicated in Table 11, replacement of 20% of the soy flour in a mixture with dextrin can decrease the viscosity by almost 50%.

TABLE 11

| 200/90 | 200/70 | 200/20 | DrySet | Viscosity |
|---|---|---|---|---|
| Composition (% of mix) | | | | |
| 100 | 0 | 0 | 0 | 1765 |
| 90 | 0 | 0 | 10 | 1396 |
| 80 | 0 | 0 | 20 | 1070 |
| 70 | 0 | 0 | 30 | 789 |
| 60 | 0 | 0 | 40 | 551 |
| 50 | 0 | 0 | 50 | 358 |
| 40 | 0 | 0 | 60 | 209 |
| 30 | 0 | 0 | 70 | 103 |
| 20 | 0 | 0 | 80 | 42 |
| 10 | 0 | 0 | 90 | 24 |
| 0 | 0 | 0 | 100 | 51 |
| 0 | 100 | 0 | 0 | 2192 |
| 0 | 90 | 0 | 10 | 1690 |
| 0 | 80 | 0 | 20 | 1252 |
| 0 | 70 | 0 | 30 | 878 |
| 0 | 60 | 0 | 40 | 568 |
| 0 | 50 | 0 | 50 | 322 |
| 0 | 40 | 0 | 60 | 139 |
| 0 | 30 | 0 | 70 | 21 |
| 0 | 20 | 0 | 80 | −33 |
| 0 | 10 | 0 | 90 | −23 |
| 0 | 0 | 0 | 100 | 51 |
| 0 | 0 | 100 | 0 | 4937 |
| 0 | 0 | 90 | 10 | 3665 |
| 0 | 0 | 80 | 20 | 2568 |
| 0 | 0 | 70 | 30 | 1644 |
| 0 | 0 | 60 | 40 | 895 |
| 0 | 0 | 50 | 50 | 319 |
| 0 | 0 | 40 | 60 | −83 |
| 0 | 0 | 30 | 70 | −310 |
| 0 | 0 | 20 | 80 | −364 |

TABLE 11-continued

| 200/90 | 200/70 | 200/20 | DrySet | Viscosity |
|---|---|---|---|---|
| Composition (% of mix) | | | | |
| 0 | 0 | 10 | 90 | −243 |
| 0 | 0 | 0 | 100 | 51 |

Example 20

Effect of pH

Soy flour comes in various forms characterized by PDI. It is common to treat all forms of soy flour as if they were indistinguishable. The effect of pH on the viscosity of the soy flours Prolia 200/20, Prolia 200/70 and Prolia 200/90, all available from Cargill, Incorporated, was determined to illustrate the dissimilarity of these materials. The viscosity of approx. 27% dispersions (as is) in water was measured. Eight grams of soy flour was weighed out and added to a RVA canister. Two drops of Patcote 376K antifoam were added and the dispersion was brought to 20-25 g with deionized water. Varied amounts of 3N NaOH or 3N HCl were added, then the weight was brought to 30 g. The dispersion was hand mixed and allowed to hydrate for about 10 minutes. The pH of the dispersion was measured and a RVA paddle was placed in the canister. The canister was then mounted on the RVA (Rapid Viscometry Analyzer, . . . ) and the viscosity in centipoise was measured at a constant temperature of 25 C and using a profile where for 2 minutes the paddle speed was 960 rpm followed by 8 minutes at 160 rpm. The viscosity was recorded after 10 minutes.

Figure 2:
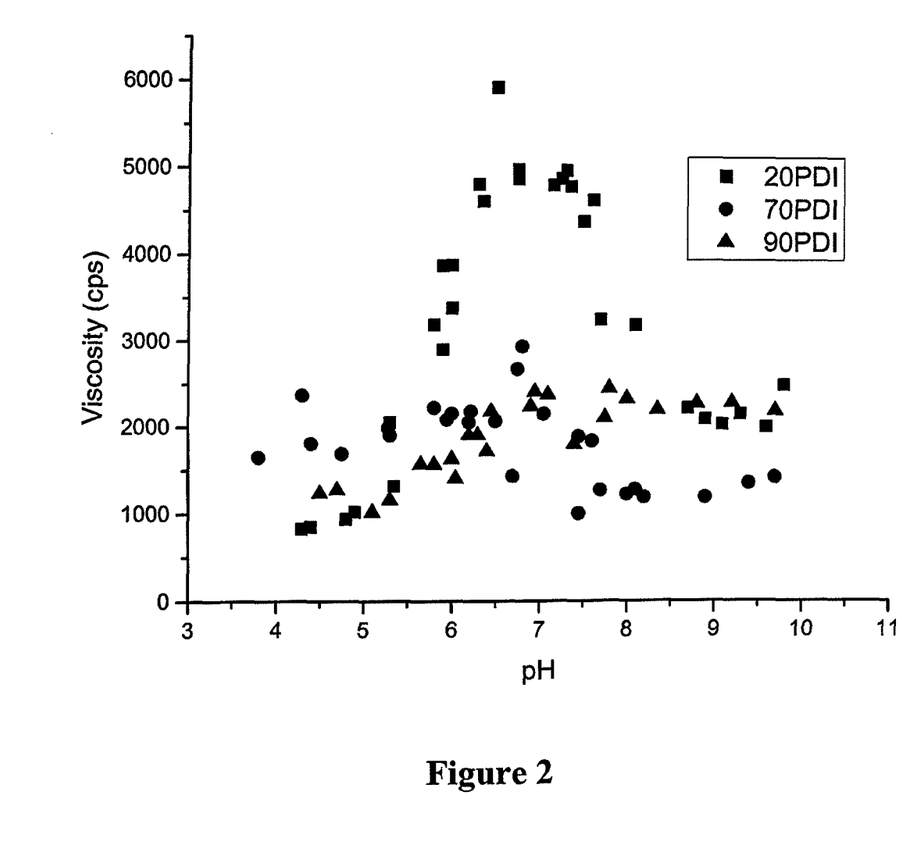
FIG. 2 illustrates the effect of pH on the viscosity of soy flours having varying protein dispersibility indexes.
Figure 3A:
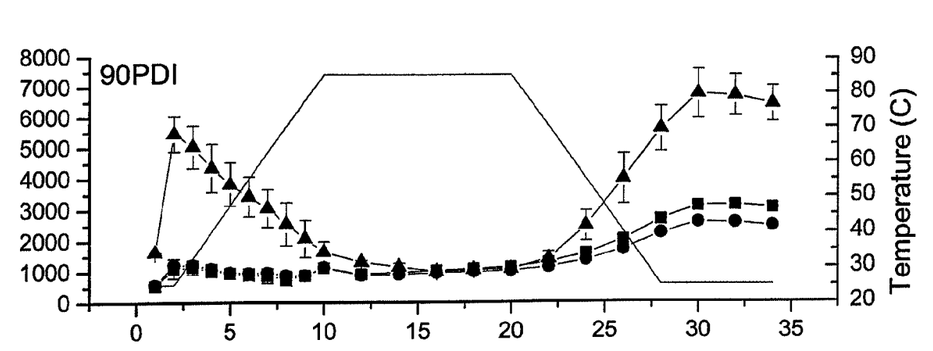
FIGS. 3a and 3b illustrates the effect of time on the viscosity of soy flours having varying particle sizes.
Figure 3B:
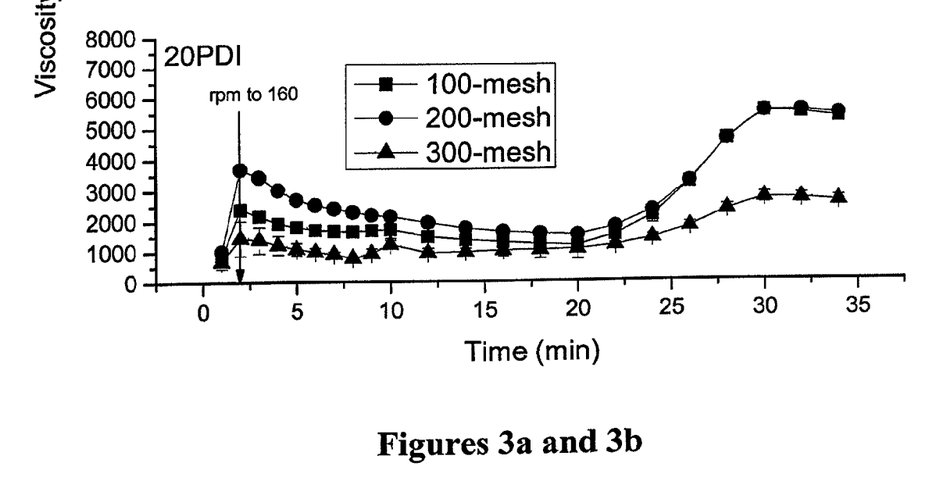

The three different soy flours do not show the same pattern of response to pH, as shown in FIG. 2.

Example 21

Effect of Particle Size

Soy flour comes in various forms characterized by particle size. It is common to treat all forms of soy flour as if they were indistinguishable. The effect of particle size on the viscosity of the soy flours Prolia 100/20, Prolia 200/20 and Prolia 300/20, all available from Cargill, Incorporated, was determined to illustrate the dissimilarity of these materials. The viscosity of approx. 27% dispersions in water was measured. Eight grams of soy flour (as is) was weighed out and added to a RVA canister. Two drops of Patcote 376K antifoam were added and the dispersion was brought to 30 g with deionized water. The dispersion was hand mixed, a RVA paddle was placed in the canister, and allowed to hydrate for about 10 minutes. The canister was then mounted on the RVA (Rapid Viscometry Analyzer, . . . ) and the viscosity in centipoise was measured at a constant temperature of 25 C and using a profile where for 2 minutes the paddle speed was 960 rpm followed by 8 minutes at 160 rpm. The viscosity was recorded after 10 minutes.

Analysis of variance showed that the mesh size had no significant effect on the viscosity with alpha=0.05.

| Mesh size | 20PDI | 90PDI |
|---|---|---|
| | Viscosity (cps) | |
| 200 | 4839 | 1724 |
| 100 | 5078 | 1785 |
| 300 | 5100 | 1801 |

Example 22

Effect of Thermal Treatment

While Example 21 shows that mesh size itself may not impact viscosity of the simple soy-water dispersion, thermal treatments may invoke more complex behavior. The effect of particle size on the viscosity of the soy flours Prolia 100/20, Prolia 200/20 and Prolia 300/20, and Prolia 100/90, Prolia 200/90 and Prolia 300/90, all available from Cargill, Incorporated, after a thermal treatment was determined to illustrate the dissimilarity of these materials. The viscosity of approx. 25% dispersions in water was measured. 7.5 grams of soy flour (as is) was weighed out and added to a RVA canister. Two drops of Patcote 376K antifoam were added and the dispersion was brought to 30 g with deionized water. The dispersion was hand mixed, a RVA paddle was placed in the canister, and allowed to hydrate for about 10 minutes. The canister was then mounted on the RVA (Rapid Viscometry Analyzer, . . . ) and the viscosity in centipoise was measured at a constant temperature of 25 C and using a profile where for 2 minutes the paddle speed was 960 rpm, then decreased for the remainder of the measurement. From 2 until 10 minutes, the temperature was linearly increased to 85 C. The temperature was held at 85 C for 10 minutes, then the sample was linearly cooled from 20 to 28 min back to 25 C. The sample was then held at 25 C for 7 minutes. The viscosity was recorded periodically. As shown in Figure X5a, 100-mesh and 200-mesh flours of both 20PDI and 90PDI soy flour behaved similarly to each other. However, the 300-mesh form of 90PDI formed a very viscous dispersion after heating and cooling, compared to the coarser forms. In contrast, the 300-mesh form of 20PDI soy flour formed a less viscous dispersion after heating than the coarser flours. In effect, the finer flour and the two coarser flours switched positions.

The disclosure has been described with reference to various specific and illustrative embodiments and techniques. However, one skilled in the art will recognize that many variations and modifications may be made while remaining within the spirit and scope of the disclosure.

What is claimed is:

1. An adhesive or binder composition comprising from about 40% to about 75% of a plant-based protein on a dry-weight basis and from about 25% to about 60% of a starch on a dry weight basis, wherein the starch comprises a dextrin.

2. The composition according to claim 1, wherein the plant protein is a modified plant protein.

3. The composition according to claim 2, wherein the modification of the plant protein is selected from the group consisting of chemical modification, physical modification, enzymatic modification, and mixtures thereof.

4. The composition of claim 1, wherein the plant protein is a seed-based protein.

5. The composition according to claim 4, wherein the seed-based protein is a soy protein.

6. The composition according to claim 4, wherein the seed-based protein is a soy protein, and the starch is a dextrin.

7. The composition according to claim 1, wherein the starch is a seed-based starch.

8. The composition according to claim 1, wherein the starch comprises a modified starch.

9. The composition according to claim 8, wherein the modification of the modified starch is selected from the group consisting of chemical modification, enzyme modification, physical modification, and mixtures thereof.

10. The composition according to claim 1, wherein the starch is a dextrin.

11. The composition according to claim 1, wherein the adhesive or binder is selected from the group consisting of a plaster, a joint compound, a sealant, a corrugating glue, a laminating adhesive, a wood glue, a plywood adhesive, a strand board adhesive, a wall board adhesive, a ceiling tile binder, a particle board binder, paper coating binder, a paint binder, and a foundry binder.

12. The composition of claim 1, wherein composition comprises about 30% to about 60% of the starch on a dry weight basis.

13. An adhesive or binder composition comprising from about 40% to about 75% of a seed-based protein on a dry weight basis and from about 25% to about 60% of a seed-based starch on a dry weight basis; and wherein the adhesive or binder composition is a plaster, a joint compound, a sealant, a corrugating glue, a laminating adhesive, a wood glue, a plywood adhesive, a strand board adhesive, a wall board adhesive, a ceiling tile binder, a particle board binder, a paper coating binder, a paint binder, or a foundry binder.

14. The composition of claim 13, wherein composition comprises about 30% to about 60% of the seed-based starch on a dry weight basis.

15. A process for producing an adhesive or binder composition comprising mixing from about 40% to about 75% of a plant protein on a dry, weight basis and from about 25% to about 60% of a starch on a dry weight basis, wherein the starch comprises a dextrin.

16. The process according to claim 15, wherein the plant protein and starch are mixed dry to form the protein-starch composition.

17. The process according to claim 15, wherein the plant protein is mixed with water to farm a first slurry, and the dry starch is mixed with the first slurry to form a second slurry containing the protein-starch composition.

18. The process according to claim 15, wherein the starch is mixed with water to form a first slurry, and the dry protein is mixed with the first slurry to form a second slurry containing the protein-starch composition.

19. The process according to claim 15, wherein the plant protein is mixed with water to form a first slurry, the starch is mixed with water to form a second slurry, and the first and second slurry are combined to form the protein-starch composition.

20. The process according to claim 15, wherein the starch is mixed with water and heated to a gelatinized paste, and the dry plant protein is combined with the starch paste to form a protein-starch composition.

21. The process according to claim 15, wherein the plant protein is mixed with water and heated to a paste, and the dry starch is combined with the protein paste to form a protein-starch composition.

22. The process according to claim 15, wherein the starch is mixed with water and heated to form a first gelatinized paste, and the plant protein is mixed with water and heated to form a second paste, and the first and second pastes are combined to form the protein-starch composition.

23. An adhesive or binder composition produced according to claim 15.

24. The adhesive or binder composition according to claim 23, wherein the adhesive or binder composition is selected from the group consisting of a plaster, a joint compound, a sealant, a corrugating glue, a laminating glue, a wood glue, a plywood adhesive, a strand board adhesive, a wallboard binder, a ceiling tile binder, a paper coating binder, a paint hinder, and a foundry binder.

25. The process of claim 15, wherein composition comprises about 30% to about 60% of the starch on a dry weight basis.

26. An adhesive or binder composition comprising from about 40% to about 75% of a plant-based protein on a dry weight basis and from about 25% to about 60% of a starch on a dry weight basis, wherein the starch comprises a dextrin; and wherein the adhesive or binder composition has a breaking force ranging from about 1.84 to 4.34 in-oz.

27. The composition of claim 26, wherein composition comprises about 30% to about 60% of the starch on a dry weight basis.

\* \* \* \* \*